United States Patent
Okazaki et al.

(10) Patent No.: US 11,812,538 B2
(45) Date of Patent: Nov. 7, 2023

(54) HUMAN BODY STATIC ELECTRICITY CONTROL DEVICE AND HUMAN BODY STATIC ELECTRICITY CONTROL SYSTEM

(71) Applicant: SHISEIDO COMPANY, LTD., Tokyo (JP)

(72) Inventors: Ryuta Okazaki, Tokyo (JP); Tomoyuki Kawasoe, Tokyo (JP); Yasuo Kato, Tokyo (JP)

(73) Assignee: Shiseido Company, Ltd., Tokyo (JP)

( * ) Notice: Subject to any disclaimer, the term of this patent is extended or adjusted under 35 U.S.C. 154(b) by 99 days.

(21) Appl. No.: 17/053,129

(22) PCT Filed: Apr. 15, 2019

(86) PCT No.: PCT/JP2019/016201
§ 371 (c)(1),
(2) Date: Nov. 5, 2020

(87) PCT Pub. No.: WO2019/216129
PCT Pub. Date: Nov. 14, 2019

(65) Prior Publication Data
US 2021/0243874 A1    Aug. 5, 2021

(30) Foreign Application Priority Data
May 8, 2018   (JP) .................. 2018-089706

(51) Int. Cl.
*H05F 3/04*     (2006.01)
*H01T 19/00*    (2006.01)
*H04L 67/12*    (2022.01)

(52) U.S. Cl.
CPC ............. *H05F 3/04* (2013.01); *H01T 19/00* (2013.01); *H04L 67/12* (2013.01)

(58) Field of Classification Search
CPC . H05F 3/04; H01T 19/00; H01T 23/00; H04L 67/12
See application file for complete search history.

(56) References Cited

U.S. PATENT DOCUMENTS 6,419,171 B1 * 7/2002 Takayanagi ............... H05F 3/04
239/270

FOREIGN PATENT DOCUMENTS

CN    106405257    *    2/2017
JP    2000-311796 A    11/2000
(Continued)

OTHER PUBLICATIONS

Extended European Search Report issued in corresponding European Patent Application No. 19799103.7, dated Jan. 3, 2022.
(Continued)

*Primary Examiner* — Kim T Nguyen
(74) *Attorney, Agent, or Firm* — Morgan, Lewis & Bockius LLP (57) ABSTRACT

The object of the present invention is to suitably control a charging state of a human body all the time. A charging amount detection device 13 is worn by a human body and measures the surface potential of the human body. A static electricity control device 12 is worn by a human body and generates and discharges ions to the human body and thereby controls the static electricity on the human body. A mobile terminal 11 sets a control pattern of the static electricity on the human body that is suitable for a condition such as temperature and humidity for the static electricity control device 12 via short-range wireless communication. The static electricity control device 12 uses the set control pattern to perform feedback control of the static electricity
(Continued)

on the human body by using the surface potential of the human body measured by the charging amount detection device 13.

9 Claims, 7 Drawing Sheets

(56) References Cited

FOREIGN PATENT DOCUMENTS

| | | |
|---|---|---|
| JP | 2001-076892 A | 3/2001 |
| JP | 2006-207553 A | 8/2006 |
| JP | 2007-047015 A | 2/2007 |
| JP | 2007-135934 A | 6/2007 |
| JP | 2007-307449 A | 11/2007 |
| JP | 2010-001666 A | 1/2010 |
| JP | 2011-151039 A | 8/2011 |
| JP | 2011-179733 A | 9/2011 |

OTHER PUBLICATIONS

International Search Report (with partial translation) and Written Opinion issued in corresponding International Patent Application No. PCT/JP2019/016201, dated Jun. 25, 2019.

\* cited by examiner

| AREA | SEASON | WEATHER | TEMPERATURE | HUMIDITY | LEVEL OF AIRBORNE POLLEN | LEVEL OF AIRBORNE YELLOW SAND | LEVEL OF AIRBORNE PARTICULATE MATTER | ... | CONTROL PATTERN | |
|---|---|---|---|---|---|---|---|---|---|---|
| | | | | | | | | | MODE | CONTROL PARAMETER |
| * | * | FINE | LOW | LOW | LOW | LOW | LOW | * | FIRST MODE | -- |
| -- | -- | -- | -- | -- | -- | -- | -- | -- | -- | -- |
| * | * | * | * | * | LOW | LOW | HIGH | -- | THIRD MODE | (nv, ov, fp) |
| -- | -- | -- | -- | -- | -- | -- | -- | -- | -- | -- |

«HUMAN BODY STATIC ELECTRICITY CONTROL DEVICE AND HUMAN BODY STATIC ELECTRICITY CONTROL SYSTEM»

TECHNICAL FIELD

The present invention relates to a technique to control static electricity on a human body.

BACKGROUND ART

A stationary installation type device that removes static electricity on a human body or removes dust or pollen attached to a human body by blowing an ion wind is known as a technique to control the static electricity on the human body (for example, Patent Literatures 1 and 2).

Further, a measuring device that measures static electricity by using a surface potential sensor (for example, Patent Literature 3) or an ion generation device that selectively generates an ion wind of positive ions and an ion wind of negative ions (for example, Patent Literatures 4 and 5) are known as techniques related to the present application.

CITATION LIST

Patent Literature

PTL 1: Japanese Patent Application Laid-Open No. 2007-307449
PTL 2: Japanese Patent Application Laid-Open No. 2011-179733
PTL 3: Japanese Patent Application Laid-Open No. 2007-47015
PTL 4: Japanese Patent Application Laid-Open No. 2007-135934
PTL 5: Japanese Patent Application Laid-Open No. 2006-207553

SUMMARY OF INVENTION

Technical Problem

It is possible to control the charging state of a human body to prevent attachment of dust or pollen to the human body or charging of the human body. Further, in terms of countermeasures against pollen allergy in spring or summer, countermeasures against static electricity in winter, or the like, it is preferable that the charging state of a human body can be suitably controlled in daily life all the time. On the other hand, the stationary installation type device that blows an ion wind described above can control the charging state of a human body in only the place where the device is installed. Accordingly, the present invention intends to suitably control static electricity on a human body in daily life all the time.

Solution to Problem

To achieve the above problems, the present invention provides a human body static electricity control device as a human body static electricity control device that controls static electricity on a human body, and the human body static electricity control device having a structure that is wearable on a human body, and the human body static electricity control device includes: an ion generation unit that generates ions; an ion discharge unit that discharges ions generated by the ion generation unit to the human body in a state where the static electricity control device is worn by the human body; and a control unit that controls an ion generation operation in the ion generation unit.

Herein, such a human body static electricity control device may configure the ion generation unit to be able to generate positive ions and negative ions and to generate positive ions and negative ions such that a positive potential and a negative potential alternately occur at a predetermined frequency as a surface potential of the human body or such that a surface potential of the human body is maintained at a predetermined potential in the control unit.

Further, to achieve the above problems, provided is a human body static electricity control system including such a human body static electricity control device. Herein, the human body static electricity control system has a charging amount measuring device having a structure that is wearable on a human body, wherein the charging amount measuring device has a measuring unit that measures a surface potential of the human body in a state where the charging amount measuring device is worn by the human body. Further, the ion generation unit of the human body static electricity control device is configured to be able to generate positive ions and negative ions, and the control unit of the human body static electricity control device controls generation of positive ions and negative ions in the ion generation unit such that a surface potential of the human body is a predetermined potential based on a surface potential of the human body measured by the charging amount measuring device.

Herein, in the control unit of the human body static electricity control device, such a human body static electricity control system may be configured to control generation of positive ions and negative ions in the ion generation unit such that a positive potential and a negative potential alternately occur at a predetermined frequency as a surface potential of the human body based on the surface potential of the human body measured by the charging amount measuring device.

Further, to achieve the above problems, the present invention provides a human body static electricity control system including such a human body static electricity control device and a mobile terminal that can communicate with the human body static electricity control device by wireless communication. Herein, an ion generation unit of the human body static electricity control device can generate positive ions and negative ions, and the mobile terminal includes a remote setting unit that sets, for the control unit of the human body static electricity control device via the wireless communication, a control pattern that defines a control detail of an ion generation operation in the ion generation unit performed by the control unit.

Further, in the remote setting unit of the mobile terminal, such a human body static electricity control system may acquire information representing a current condition at a position of a predetermined weather factor where the mobile terminal is located and change a control pattern set for the control unit of the human body static electricity control device in accordance with a weather factor represented by acquired information.

Alternatively, in such a human body static electricity control system, a server that provides the control pattern may be provided in the mobile terminal, and in the control unit of the human body static electricity control device, a control pattern provided from the server may be set for the remote setting unit of the mobile terminal. Note that the server acquires information representing a current condition at a position of a predetermined weather factor where the mobile terminal is located and changes a control pattern provided to the mobile terminal in accordance with a weather factor represented by acquired information.

Herein, in the above human body static electricity control system, a control pattern set for the control unit of the human body static electricity control device by the remote setting unit of the mobile terminal may include at least any one of a first control pattern to control generation of positive ions and negative ions in the ion generation unit so that a surface potential of the human body becomes a predetermined potential and a second control pattern to control generation of positive ions and negative ions in the ion generation unit such that a positive potential and a negative potential alternately occur at a predetermined frequency as a surface potential of the human body.

According to the human body static electricity control device or the human body static electricity control system described above, it is possible to control static electricity on a human body in daily life all the time by a human body static electricity control device worn by the human body.

Further, according to the human body static electricity control system including the above mobile terminal, it is possible to suitably control static electricity on a human body by using a suitable control pattern in accordance with the current environment of the human body, such as a control pattern in accordance with a condition of weather factors such as pollen dispersal, particulate matter dispersal, temperature, or humidity.

Advantageous Effects of Invention

As described above, according to the present invention, it is possible to suitably control static electricity on a human body in daily life all the time.

DESCRIPTION OF EMBODIMENTS

Figure 1:
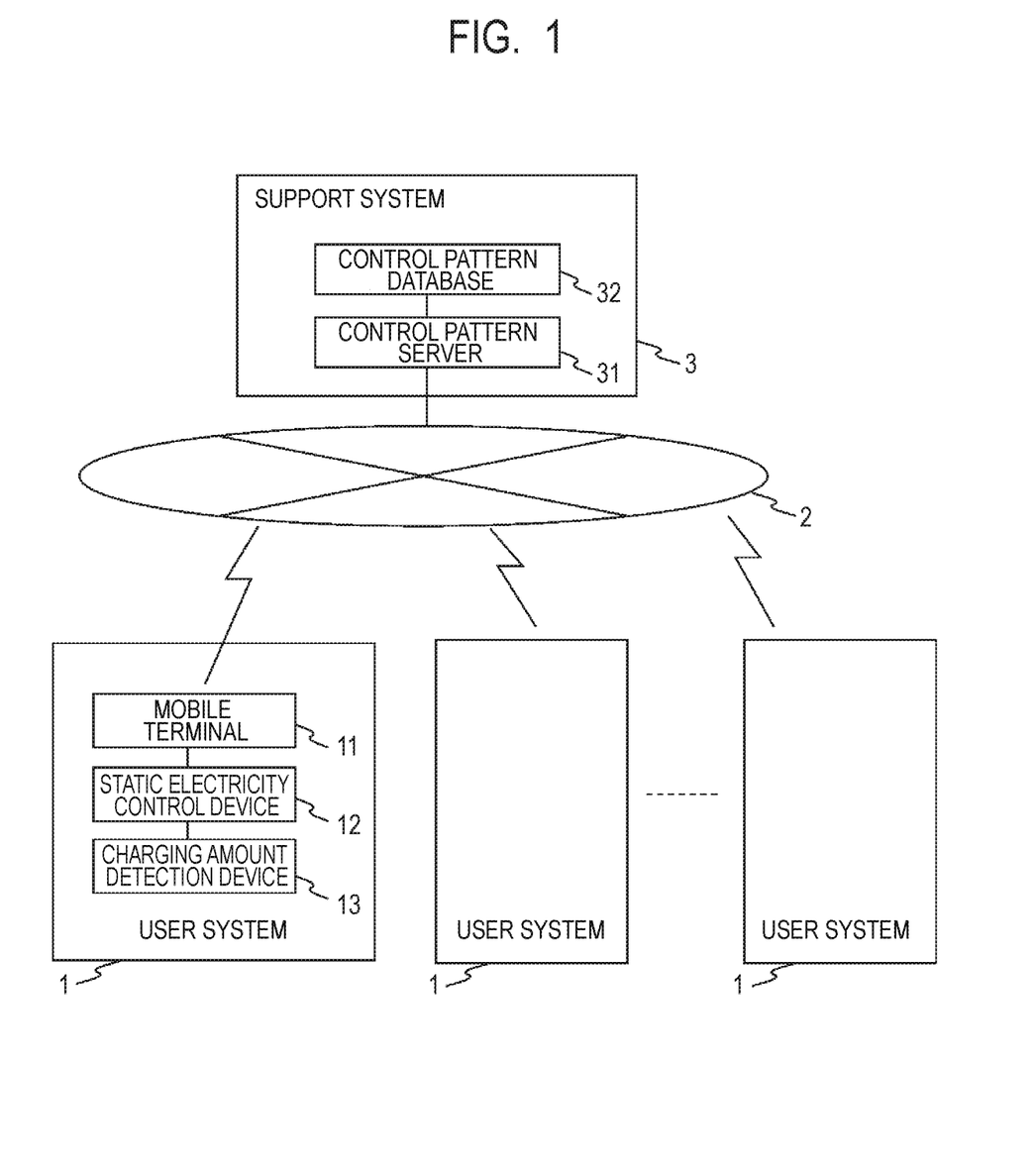
FIG. 1 is a block diagram illustrating a configuration of a human body static electricity control system according to an embodiment of the present invention.

The embodiment of the present invention will be described below. FIG. 1 illustrates a configuration of a human body static electricity control system according to the present embodiment. As illustrated in the drawing, the human body static electricity control system has a user system 1 used by each user and a support system 3 arranged on a WAN 2 such as the Internet. The user system 1 further has a mobile terminal 11 such as a smartphone or a smartwatch carried by the user, a static electricity control device 12, and a charging amount detection device 13, and the mobile terminal 11 and the static electricity control device 12 can communicate with each other and the static electricity control device 12 and the charging amount detection device 13 can communicate with each other by short-range wireless communication, respectively.

The support system 3 further has a control pattern server 31 and a control pattern database 32. Further, the mobile terminal 11 of each user system 1 can communicate with the control pattern server 31 of the support system 3 via mobile communication or wireless communication such as Wi-Fi.

Figure 2:
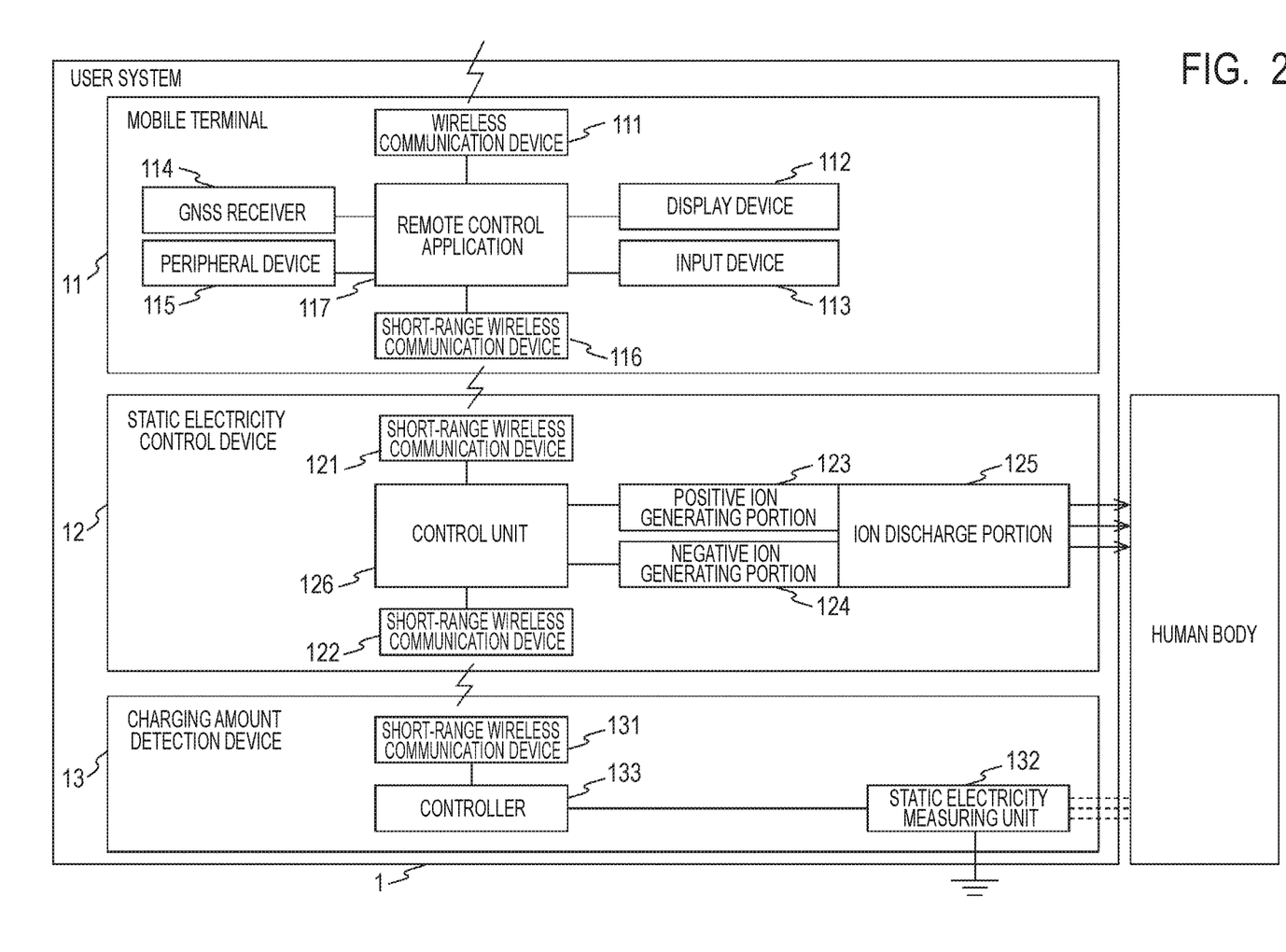
FIG. 2 is a block diagram illustrating a configuration of a user system according to the embodiment of the present invention.

Next, FIG. 2 illustrates details of the configuration of the user system 1. As illustrated in the drawing, the mobile terminal 11 of the user system 1 has a wireless communication device 111 that performs mobile communication or wireless communication, a display device 112, an input device 113, a GNSS receiver 114 such as a GPS receiver that calculates a current position, a peripheral device 115 such as a voice input/output device or a storage device, a short-range wireless communication device 116 for performing short-range wireless communication such as Bluetooth (registered trademark) with the static electricity control device 12, and a remote control application 117. Further, although illustration is omitted, the mobile terminal 11 has other applications such as a telephone application for performing a telephone call via mobile communication or wireless communication, a Web browser application, or a mail application.

Next, the static electricity control device 12 of the user system 1 has a short-range wireless communication device 121 for performing short-range wireless communication such as Bluetooth (registered trademark) with the mobile terminal 11, a short-range wireless communication device 122 for performing short-range wireless communication with the charging amount detection device 13, a positive ion generation unit 123 that generates ions having positive plasma by corona discharge or the like, a negative ion generation unit 124 that generates ions having negative plasma by corona discharge or the like, an ion discharge portion 125 that discharges ions to a human body, and a control unit 126 that controls each unit. Note that the configuration of the negative ion generation unit 124 and the ion discharge portion 125, which discharges ions to a human body, may be partially shared. For example, when the negative ion generation unit 124 and the ion discharge portion 125, which discharges ions to a human body, generate ions by corona discharge, an electrode may be shared by the positive ion generation unit 123 and the negative ion generation unit 124, and ions may be generated by using the same electrode.

Next, the charging amount detection device 13 of the user system 1 has a short-range wireless communication device 131 for performing short-range wireless communication with the static electricity control device 12, a static electricity measuring unit 132 such as a surface potential sensor that measures static electricity on a human body, and a controller 133.

Figure 3A:
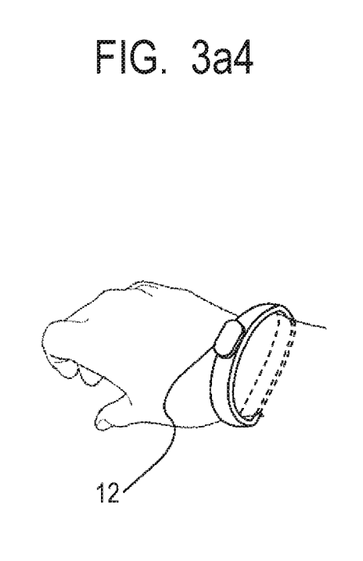
FIG. 3 is a diagram illustrating a configuration example of a static electricity control device according to the embodiment of the present invention.
Figure 3A:
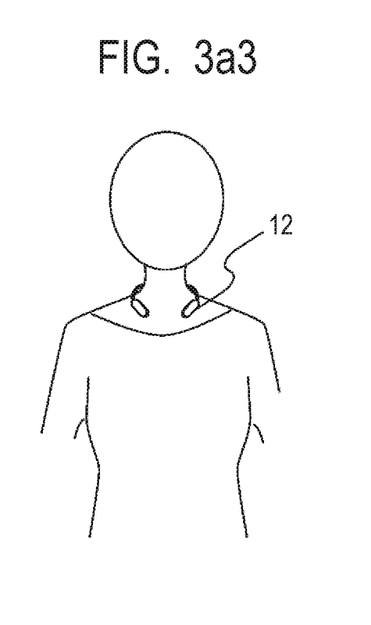
Figure 3A:
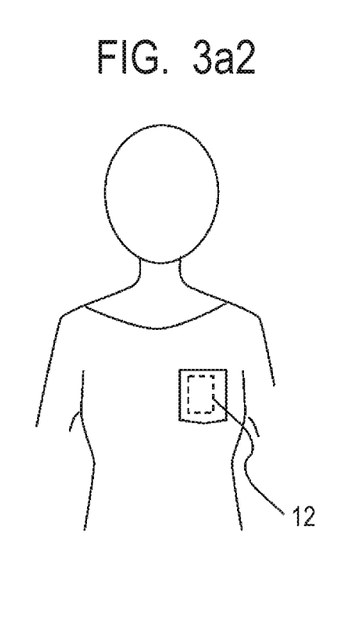
Figure 3A:
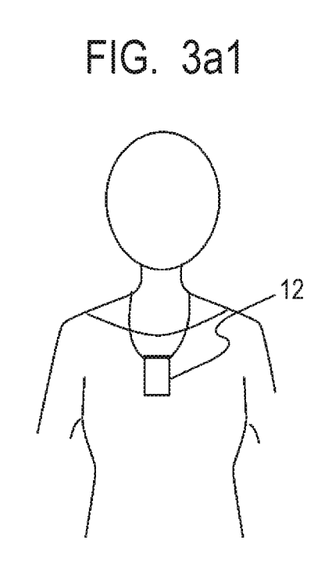

Herein, the static electricity control device 12 is a device worn by the human body. More specifically, the static electricity control device 12 may be a device that can be hung from the neck in a pendant shape as illustrated in FIG. 3a1, may be a device that can be put in the pocket as illustrated in FIG. 3a2, may be a neck hanging type device as illustrated in FIG. 3a3, or may be a wristband type device as illustrated in FIG. 3a4.

Figure 3B:
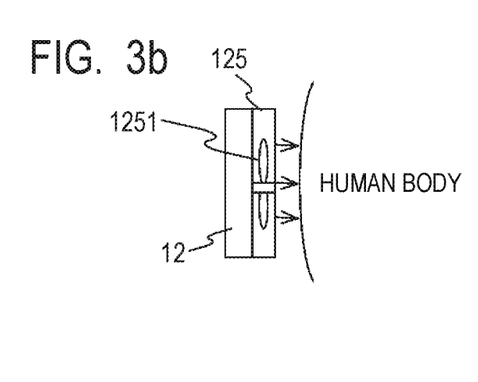

Further, the static electricity control device 12 discharges, from the ion discharge portion 125 to a human body, an ion wind of ions generated by the plasma ion generation unit 123 or the negative ion generation unit 124, as illustrated in FIG. 3b. Note that, as illustrated in FIG. 3a1 and FIG. 3a2, when the static electricity control device 12 is configured to be arranged slightly apart from a human body surface, it is preferable that an air blower 1251 that blows an ion wind to a human body be provided in the ion discharge portion 125 as illustrated in FIG. 3b. Note that, as illustrated in FIG. 3a3 and FIG. 3a4, when the static electricity control device 12 is configured to be arranged in close contact with a human body surface, the air blower 1251 is not necessarily required to be provided in the ion discharge portion 125, and the ion discharge portion 125 may be a mere hollow air duct.

Next, the charging amount detection device 13 is worn by a human body so as to be in close contact with the human body. Further, the charging amount detection device 13 is grounded, and the static electricity measuring unit 132 measures the surface potential of a human body based on the ground potential.

Figure 4:
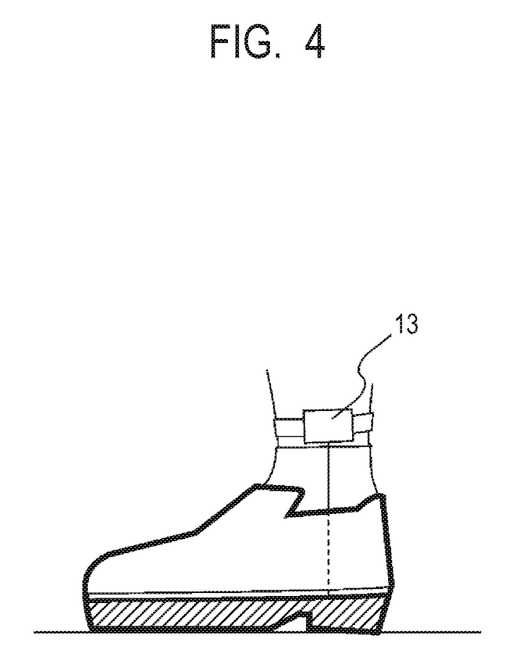
FIG. 4 is a diagram illustrating a configuration example of a charging amount detection device according to the embodiment of the present invention.

More specifically, for example, as illustrated in FIG. 4, close contact with a human body and grounding of the charging amount detection device 13 are realized when the charging amount detection device 13 is a device worn by a leg of the user by using a belt or the like, and the ground wire of the charging amount detection device 13 is connected to a conductive sole of a shoe.

In such a configuration, the control unit 126 of the static electricity control device 12 controls the positive ion generation unit 123 and the negative ion generation unit 124 and controls the polarity or the amount of ions discharged to a human body to control static electricity on the human body.

Figure 5A:
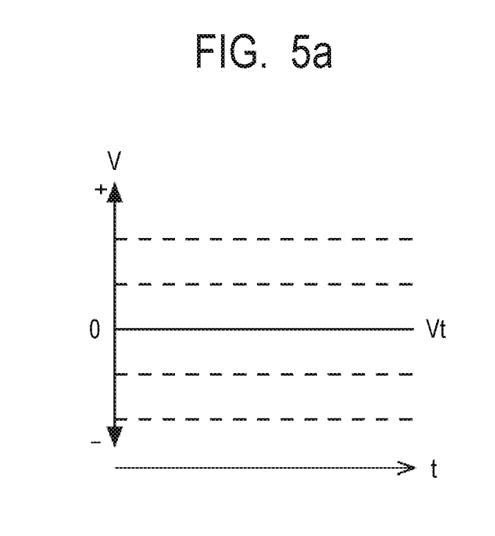
FIG. 5 is a diagram illustrating control patterns according to the embodiment of the present invention.

Herein, the control unit 126 can control static electricity on a human body in three modes. As illustrated in FIG. 5a, the first mode is a mode to generate ions so that the surface potential Vt of the human body becomes 0.

In the first mode, the control unit 126 acquires the surface potential of the human body measured by the static electricity measuring unit 132 from the controller 133 of the charging amount detection device 13 via short-range wireless communication and performs feedback control of the polarity or the amount of ions discharged to the human body so that the surface potential of the human body measured by the static electricity measuring unit 132 becomes 0.

Figure 5B:
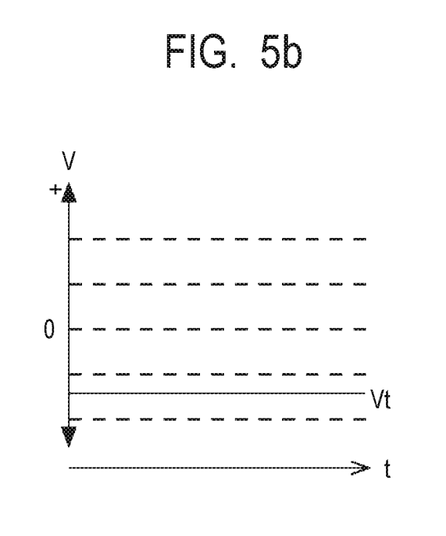

Herein, the above first mode is suitable for preventing occurrence of static electricity on a human body in winter or in a dry season. Next, in the second mode, as illustrated in FIG. 5b, the control unit 126 acquires the surface potential of a human body measured by the static electricity measuring unit 132 from the controller 133 of the charging amount detection device 13 via short-range wireless communication and performs feedback control of the polarity or the amount of ions discharged to the human body so that the surface potential Vt of the human body measured by the static electricity measuring unit 132 is a positive or negative constant potential. Herein, the potential controlled to be a constant potential is set from the mobile terminal 11 via short-range wireless communication as a control parameter.

Note that, in the second mode, no feedback control may be performed, and the polarity or the amount of ions discharged to a human body may be controlled so that the surface potential Vt of the human body is expected to be a constant potential indicated by a control parameter. That is, for example, as illustrated in FIG. 5b, positive or negative ions to be generated may be controlled to be constant by defining the vertical axis of FIG. 5b as the generation amount of positive and negative ions.

Herein, since dust or particles charged with the same polarity as the surface potential Vt of a human body repel the human body surface and are removed from the human body, the second mode is suitable for removing dust or particles, which are charged in one polarity, from the human body or removing pollen, which is often positively charged, from the human body.

Figure 5C:
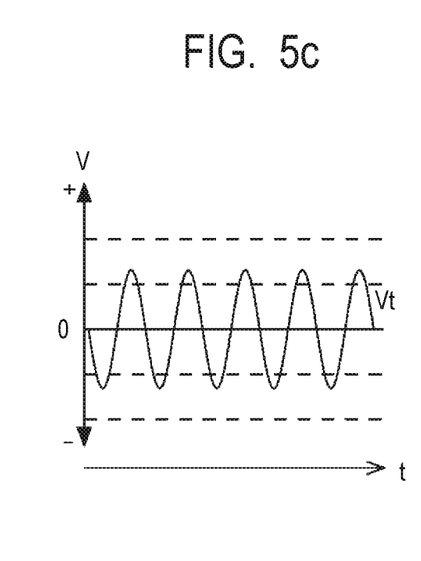

Next, as illustrated in FIG. 5c, in the third mode, the control unit 126 acquires the surface potential of a human body measured by the static electricity measuring unit 132 from the controller 133 of the charging amount detection device 13 via short-range wireless communication and performs feedback control of the polarity or the amount of ions discharged to the human body so that the surface potential Vt of the human body measured by the static electricity measuring unit 132 alternately changes between positive and negative. Herein, an amplitude, a central potential, and a frequency of changes of the surface potential Vt of the human body are set from the mobile terminal 11 via short-range wireless communication as control parameters.

Note that, in the third mode, no feedback control may be performed, and the polarity or the amount of ions discharged to a human body may be controlled so that the surface potential Vt of the human body is expected to be changed in accordance with the amplitude, the central potential, and the frequency indicated by the control parameters. That is, for example, positive and negative ions may be controlled so as to be alternately generated by defining the vertical axis of FIG. 5c as the generation amount of positive and negative ions as illustrated in FIG. 5c. Note that, in the third mode, the surface potential Vt of the human body may be caused to change between positive and negative in an alternating manner by generating positive ions and negative ions alternately, or the surface potential Vt of the human body may be caused to change between positive and negative in an alternating manner by generating positive ions and negative ions simultaneously and controlling the generation amount of respective ions so that the generation amount of positive ions and negative ions alternately increases and decreases.

The third mode is suitable for causing positively charged pollen, positively charged dust, or positively charged particles and negatively charged pollen, negatively charged dust, or negatively charged particles attached to the human body surface to be alternately repelled against the human body surface to cause pollen, dust, or particles to detach from the human body and thereby remove pollen, dust, or particles from the human body surface. Note that, for example, pollen, dust, or particles charged in the opposite polarity are attracted to the human body surface during a period in which the surface potential Vt of a human body is controlled to the one polarity, and it is expected that the attracted pollen, dust, or particles repel the human body surface, detach from the human body, and leave a human body by a wind or the like when the surface potential Vt of the human body becomes the opposite polarity.

Further, with a sufficiently high third frequency being set, even during a period in which the surface potential Vt of a human body is controlled to one polarity, and it can be expected that the polarity is switched before pollen, dust, or particles charged in the opposite polarity are adsorbed on the human body surface and that attachment of the charged pollen, the charged dust, or the charged particles to the human body surface can be prevented.

Further, with a suitably set third frequency, it is expected that attachment of a bug such as a mosquito to a skin of a human body can be prevented. Further, the control unit 126 of the static electricity control device 12 uses the control parameter set from the mobile terminal 11 and controls static electricity on a human body in a mode out of the above three modes set from the mobile terminal 11 via short-range wireless communication.

Figure 6:
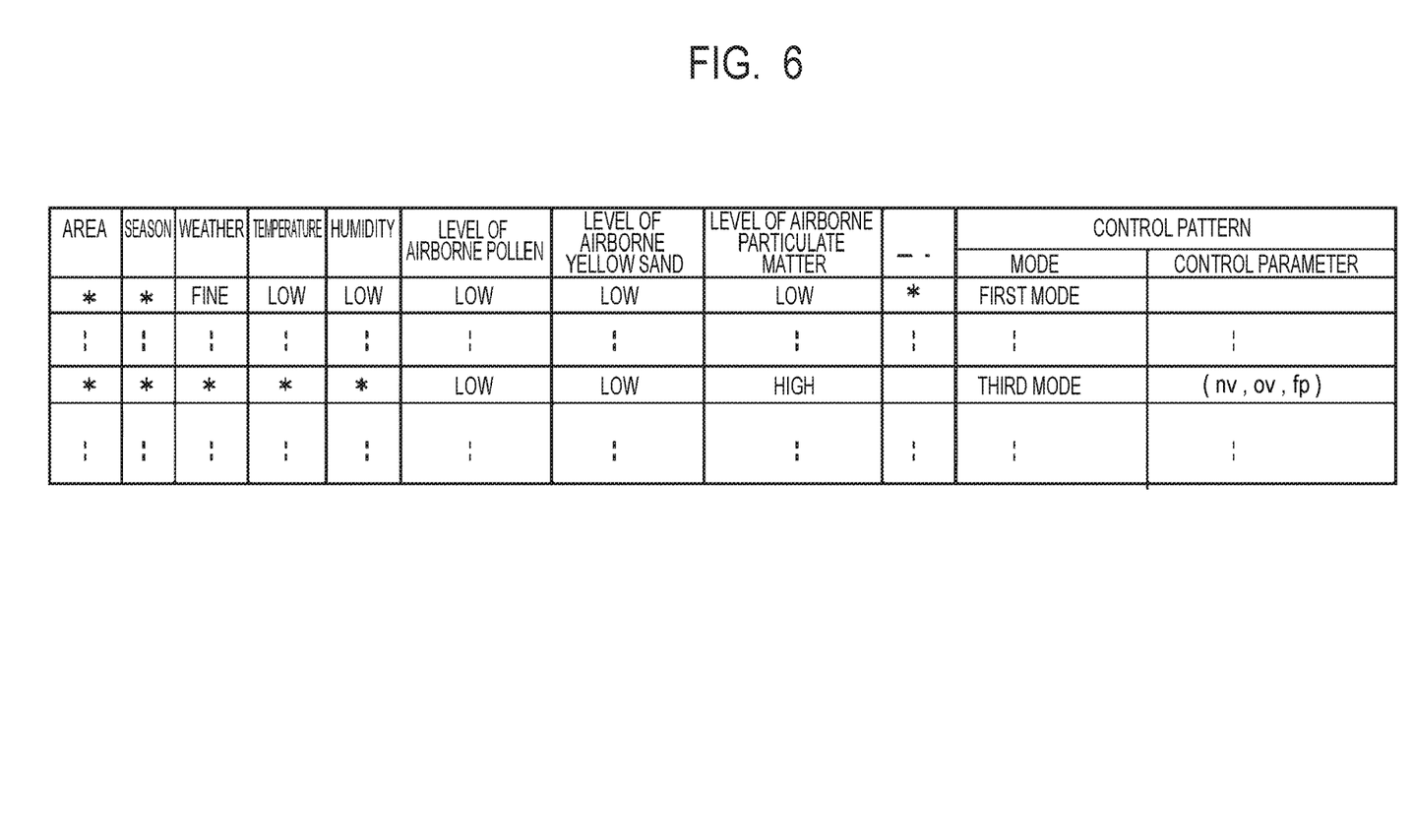
FIG. 6 is a diagram illustrating details of a control pattern database according to the embodiment of the present invention.

Next, as illustrated in FIG. 6, control patterns are registered in the control pattern database 32 of the support system 3 for each combination of conditions for respective attributes of the user environment such as an area, a season, or various predetermined weather factors. In the present embodiment, weather, temperature, humidity, a level of airborne pollen, a level of airborne yellow sand, a level of airborne particulate matter, or the like are used as a predetermined weather factor.

Further, the control pattern defines a suitable mode and a suitable control parameter that are used in the control of static electricity on a human body by the control unit 126 of the static electricity control device 12 for the user who is under the environment corresponding to a combination of conditions for respective attributes whose control parameters are registered.

For example, when the weather is fine, the temperature is low, the humidity is low, and the level of airborne pollen, the level of airborne yellow sand, and the level of airborne particulate matter are low, since static electricity is more likely to occur on the human body while harmful matter attached to the human body is less, the control pattern defining the first mode that is suitable for preventing occurrence of static electricity is registered for a combination of conditions of attributes including fine weather, low temperature, low humidity, and a low level of airborne pollen, a low level of airborne yellow sand, and a low level of airborne particulate matter.

Further, for example, since it is desirable to perform removal of particulate matter from the human body intensively when the level of airborne pollen is low, the level of airborne yellow sand is low, and the level of airborne particulate matter is high, the third mode that is suitable for removing particulate matter and a control pattern that defines control parameters of an amplitude, a central potential, and a frequency that are suitable for removing particulate matter are registered for a combination of conditions of attributes including a low level of airborne pollen, a low level of airborne yellow sand, and a high level of airborne particulate matter.

Figure 7A:
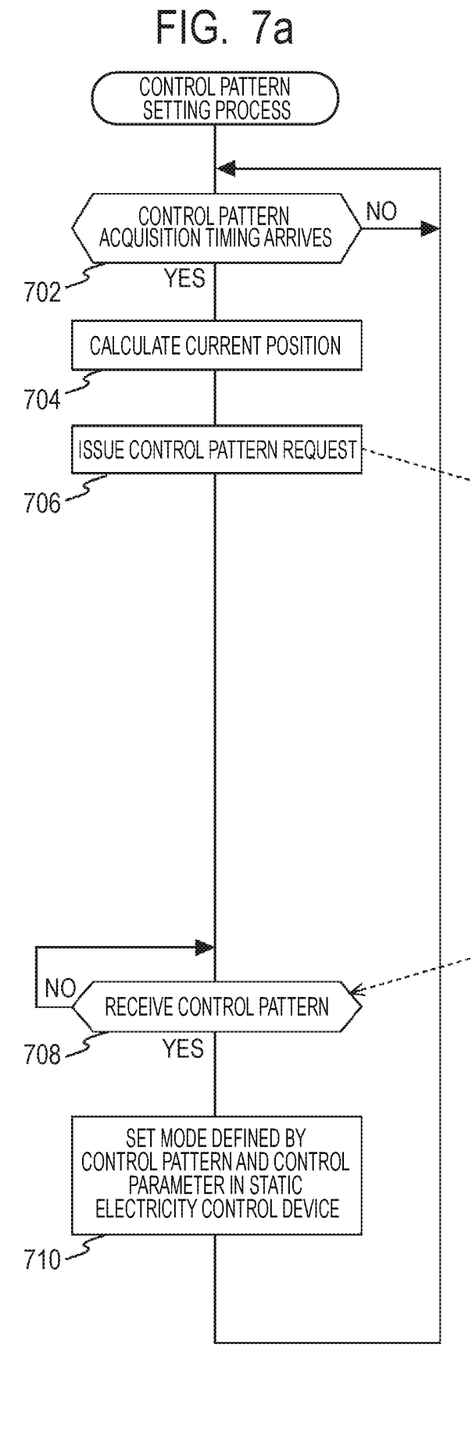
FIG. 7 is a flowchart illustrating a control pattern setting process and a control pattern providing process according to the embodiment of the present invention.
Figure 7B:
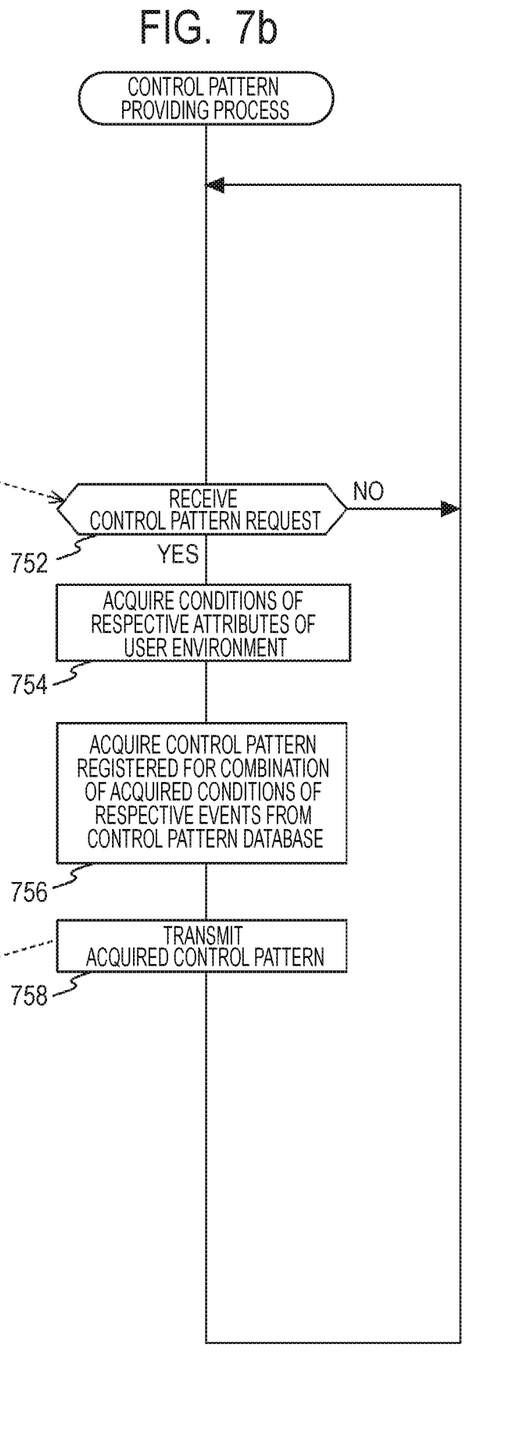

Such a control pattern is set in the control unit 126 of the static electricity control device 12 by the control pattern setting process in FIG. 7a performed by the remote control application 117 of the mobile terminal 11 of the user system 1 and the control pattern setting process in FIG. 7b performed by the control pattern server 31 of the support system 3.

That is, as illustrated in FIG. 7a, in the control pattern setting process, the remote control application 117 of the mobile terminal 11 waits for arrival of a predetermined control pattern acquisition timing (step 702).

Herein, the control pattern acquisition timing is one or both of a periodical timing such as one or multiple times per day and a timing when the acquisition of a control pattern is instructed via the input device 113 by the user, for example.

Then, if the control pattern acquisition timing arrives, the current position is calculated by using the GNSS receiver 114 (step 704), and a control pattern request including the calculated current position is transmitted to the control pattern server 31 of the support system 3 via wireless communication (step 706).

Then, if the control pattern is received from the control pattern server 31 as a response of the control pattern request (step 708), a mode and a control parameter that are defined by the received control pattern are set for the control unit 126 of the static electricity control device 12 via short-range wireless communication (step 710).

The process then returns to step 702 and waits for arrival of the next control pattern acquisition timing. Herein, as described above, the control unit 126 of the static electricity control device 12 controls static electricity on the human body by using the control parameter set from the mobile terminal 11 in the mode set from the mobile terminal 11 in such a way.

On the other hand, as illustrated in FIG. 7b, if the control pattern server 31 of the support system 3 receives the control pattern request from the mobile terminal 11 in the control pattern setting process (step 752), conditions such as the area indicated by the current position included in the control pattern request, the current season, or the weather, the temperature, the humidity, the level of airborne pollen, the level of airborne yellow sand, the level of airborne particulate matter, or the like of the area indicated by the current position are acquired as the conditions for respective attributes of the user environment (step 754).

Herein, the acquisition of conditions of respective weather factors such as weather, temperature, humidity, a level of airborne pollen, a level of airborne yellow sand, and a level of airborne particulate matter is performed by acquiring information on conditions of these weather factors in the area indicated by the current position included in the control pattern request from a weather information server that is separately provided and provides weather information or the like, for example. Alternatively, information on conditions of these weather factors in each area is stored and updated in the control pattern server 31 at any time, and information on conditions of these weather factors in the area indicated by the current position included in the control pattern request may be acquired from the stored information.

Then, next, the control pattern registered in the control pattern database 32 for a combination of conditions for respective attributes of the user environment indicated by conditions for respective attributes of the acquired user environment is acquired (step 756), and the acquired control pattern is transmitted to the mobile terminal 11 that is an issuing source of the control pattern request (step 758).

The process then returns to step 752 and waits for receiving the next control pattern request. A setting operation of a control pattern in the control unit 126 of the static electricity control device 12 has been described above. Next, a monitoring process performed by the remote control application 117 of the mobile terminal 11 will be described. In the monitoring process, the remote control application 117 acquires, from the control unit 126 of the static electricity control device 12, the surface potential of a human body acquired by the control unit 126 from the charging amount detection device 13 via short-range wireless communication and displays the acquired surface potential on the display device 112 all the time or in response to a user operation. Further, when the acquired surface potential of the human body indicates an abnormal value in the monitoring process, the remote control application 117 also performs a process of outputting an alert such as a warning beep that calls the user's attention or the like.

Further, the remote control application 117 of the mobile terminal 11 additionally performs a process of accepting a mode switching operation from the user and switching the mode set for the control unit 126 of the static electricity control device 12, a process of displaying a predetermined setting accepting window, accepting a control pattern change operation from the user, and changing the control pattern set for the control unit 126 of the static electricity control device 12, or the like.

The embodiment of the present invention has been described above. The above embodiment may be configured to provide the function of the support system 3 in each mobile terminal 11 without providing the support system 3.

Further, although the static electricity control device 12 controls static electricity on the human body by discharging ions generated by corona discharge in the above embodiment, the static electricity control device 12 may apply static electricity generated by another scheme such as frictional charging or peeling charging to the human body, for example.

Further, although the charging amount detection device 13 is grounded in the above embodiment, when the static electricity measuring unit 132 that can detect the state of static electricity on a human body surface without using the ground potential is used, the charging amount detection device 13 is not required to be grounded. Further, although the mobile terminal 11 and the static electricity control device 12 perform short-range wireless communication in the above embodiment, the mobile terminal 11 and the static electricity control device 12 may communicate with each other by another wireless communication or wired communication.

Further, while the static electricity control device 12 and the charging amount detection device 13 perform short-range wireless communication in the above embodiment, the static electricity control device 12 and the charging amount detection device 13 may communicate with each other by another wireless communication or wired communication. Further, the above embodiment may be configured to provide the function of the mobile terminal 11 in the static electricity control device 12 without providing the mobile terminal 11. Further, the above embodiment may be configured to set a control pattern in response to accepting a user operation in the static electricity control device 12 or may be configured to use a fixed control pattern in the static electricity control device 12 without providing the mobile terminal 11 and the support system 3.

As described above, according to the present embodiment, it is possible to control static electricity on a human body in daily life all the time by the static electricity control device 12 worn by the human body. Further, according to the present embodiment, it is possible to suitably control static electricity on a human body by using a suitable control pattern in accordance with the current environment of the human body such as a control pattern in accordance with a condition of weather factors such as pollen dispersal, particulate matter dispersal, temperature, or humidity.

REFERENCE SIGNS LIST

1 user system
2 WAN
3 support system
11 mobile terminal
12 static electricity control device
13 charging amount detection device
31 control pattern server
32 control pattern database
111 wireless communication device
112 display device
113 input device
114 GNSS receiver
115 peripheral device
116 short-range wireless communication device
117 remote control application
121 short-range wireless communication device
122 short-range wireless communication device
123 positive ion generation unit
124 negative ion generation unit
125 ion discharge portion
126 control unit
131 short-range wireless communication device
132 static electricity measuring unit
133 controller
1251 air blower

The invention claimed is:

1. A human body static electricity control device that controls static electricity on a human body and has a structure that is wearable on the human body, the human body static electricity control device comprising:
an ion generation unit that generates ions;
an ion discharge unit that discharges the ions generated by the ion generation unit to the human body in a first state where the human body static electricity control device is worn by the human body; and
a control unit that controls an ion generation operation in the ion generation unit,
wherein the ion generation unit is capable of generating positive ions and negative ions, and
wherein the control unit causes the ion generation unit to generate the positive ions and the negative ions such that a positive potential and a negative potential alternately occur at a predetermined frequency as a surface potential of the human body.

2. A human body static electricity control system comprising the human body static electricity control device according to claim 1, further comprising a charging amount measuring device having a structure that is wearable on the human body,
wherein the charging amount measuring device has a measuring unit that measures the surface potential of the human body in a second state where the charging amount measuring device is worn by the human body, and
wherein the control unit of the human body static electricity control device controls the generation of the positive ions and the negative ions in the ion generation unit such that the surface potential of the human body is maintained at a predetermined positive or negative constant potential based on the surface potential of the human body measured by the charging amount measuring device.

3. A human body static electricity control system comprising the human body static electricity control device according to claim 1, further comprising a charging amount measuring device having a structure that is wearable on the human body,
wherein the charging amount measuring device has a measuring unit that measures the surface potential of the human body in a second state where the charging amount measuring device is worn by the human body, and
wherein the control unit of the human body static electricity control device controls the generation of the positive ions and the negative ions in the ion generation unit such that the positive potential and the negative potential alternately occur at the predetermined frequency as the surface potential of the human body based on the surface potential of the human body measured by the charging amount measuring device.

4. A human body static electricity control system comprising the human body static electricity control device according to claim 1, further comprising a mobile terminal that is capable of communicating with the human body static electricity control device,
  wherein the mobile terminal comprises a remote setting unit that sets, for the control unit of the human body static electricity control device via the communication, a control pattern that defines a control detail of the ion generation operation in the ion generation unit performed by the control unit.

5. The human body static electricity control system according to claim 4, wherein the remote setting unit of the mobile terminal acquires information representing a current condition at a position of a predetermined weather factor where the mobile terminal is located and changes the control pattern set for the control unit of the human body static electricity control device in accordance with the predetermined weather factor represented by the acquired information.

6. The human body static electricity control system according to claim 5, wherein the control pattern set for the control unit of the human body static electricity control device by the remote setting unit of the mobile terminal includes at least any one of a first control pattern to control the generation of the positive ions and the negative ions in the ion generation unit so that the surface potential of the human body becomes a predetermined potential and a second control pattern to control the generation of the positive ions and the negative ions in the ion generation unit such that the positive potential and the negative potential alternately occur at the predetermined frequency as the surface potential of the human body.

7. The human body static electricity control system according to claim 4, further comprising a server that provides the mobile terminal with the control pattern,
  wherein the remote setting unit of the mobile terminal sets the control pattern provided from the server for the control unit of the human body static electricity control device, and
  wherein the server acquires information representing a current condition at a position of a predetermined weather factor where the mobile terminal is located and changes the control pattern provided to the mobile terminal in accordance with the predetermined weather factor represented by the acquired information.

8. The human body static electricity control system according to claim 7, wherein the control pattern set for the control unit of the human body static electricity control device by the remote setting unit of the mobile terminal includes at least any one of a first control pattern to control the generation of the positive ions and the negative ions in the ion generation unit so that the surface potential of the human body becomes a predetermined potential and a second control pattern to control the generation of the positive ions and the negative ions in the ion generation unit such that the positive potential and the negative potential alternately occur at the predetermined frequency as the surface potential of the human body.

9. The human body static electricity control system according to claim 4, wherein the control pattern set for the control unit of the human body static electricity control device by the remote setting unit of the mobile terminal includes at least any one of a first control pattern to control the generation of the positive ions and the negative ions in the ion generation unit so that the surface potential of the human body becomes a predetermined potential and a second control pattern to control the generation of the positive ions and the negative ions in the ion generation unit such that the positive potential and the negative potential alternately occur at the predetermined frequency as the surface potential of the human body.

* * * * *